Jan. 31, 1933.  V. BENDIX ET AL  1,895,965
MAGNETIC AUTOMOTIVE BRAKE
Original Filed July 11, 1928  2 Sheets-Sheet 1
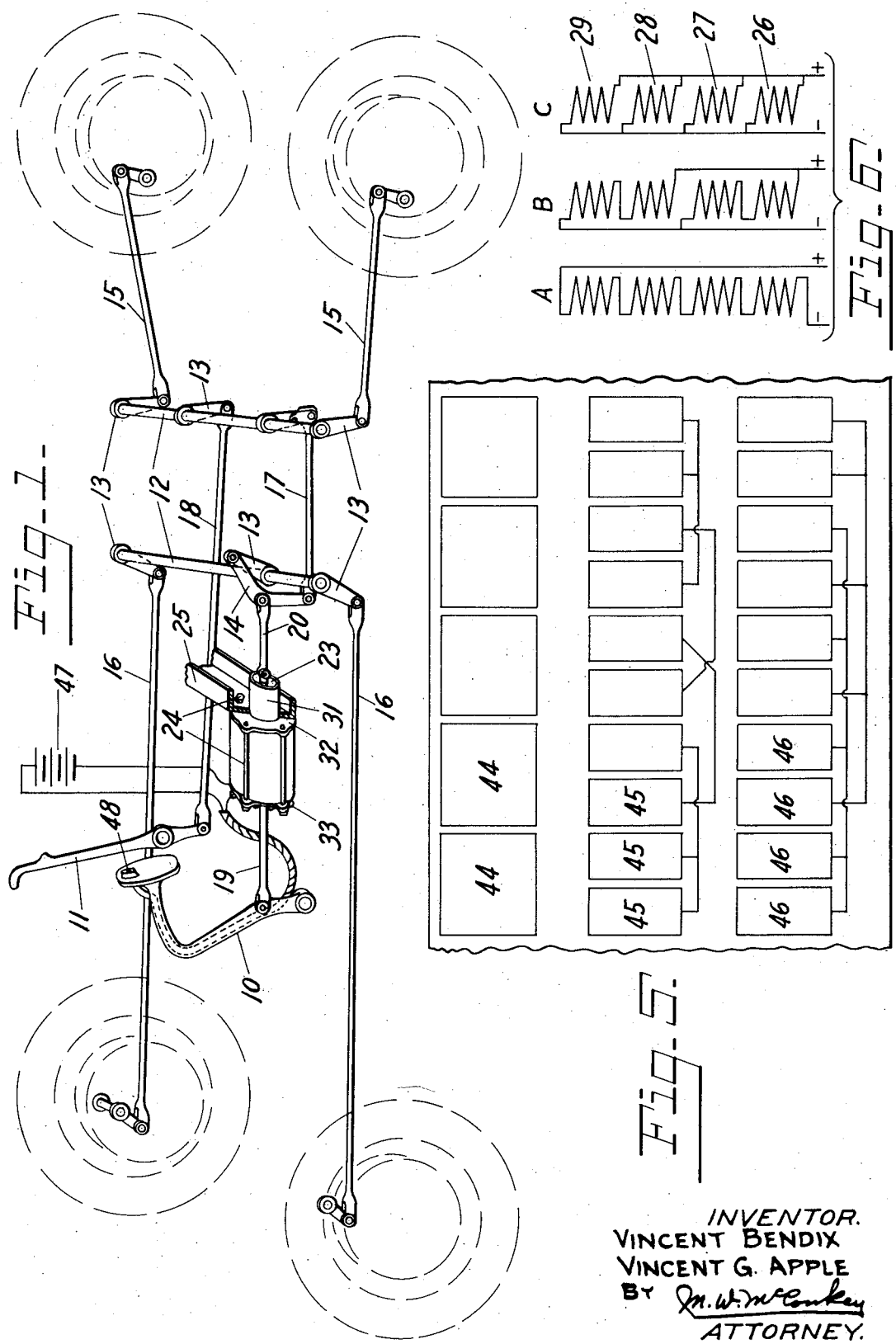
INVENTOR.
VINCENT BENDIX
VINCENT G. APPLE
BY *M. W. McConkey*
ATTORNEY.

Jan. 31, 1933.      V. BENDIX ET AL      1,895,965
MAGNETIC AUTOMOTIVE BRAKE
Original Filed July 11, 1928     2 Sheets-Sheet 2
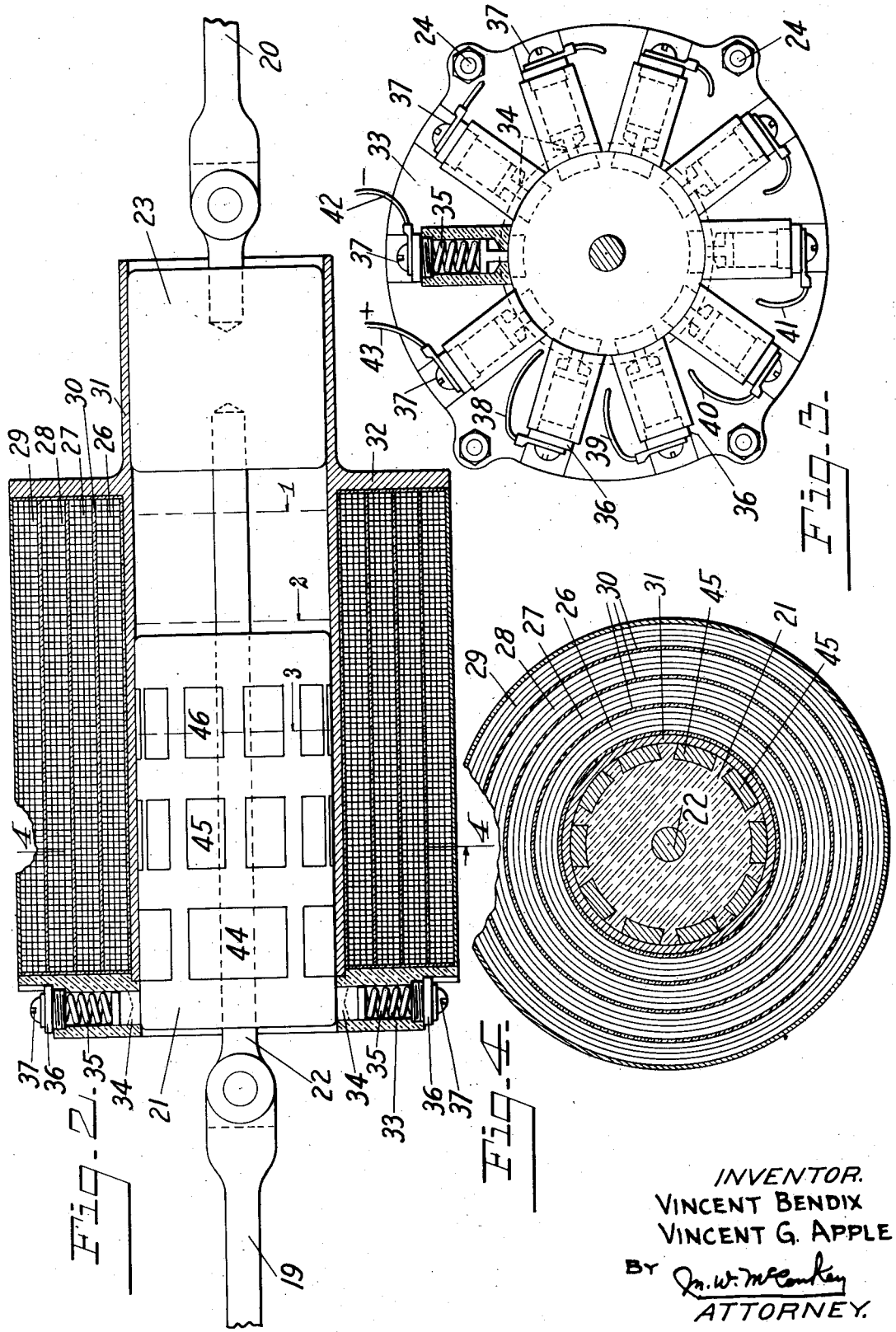
INVENTOR.
VINCENT BENDIX
VINCENT G. APPLE
BY *m.W. McConkey*
ATTORNEY.

Patented Jan. 31, 1933

1,895,965

UNITED STATES PATENT OFFICE

VINCENT BENDIX, OF CHICAGO, ILLINOIS, AND VINCENT G. APPLE, OF DAYTON, OHIO, ASSIGNORS TO BENDIX BRAKE COMPANY, OF SOUTH BEND, INDIANA, A CORPORATION OF ILLINOIS

MAGNETIC AUTOMOTIVE BRAKE

Application filed July 11, 1928, Serial No. 291,838. Renewed July 23, 1930.

Our invention relates to magnetic brakes of the servo or booster type wherein the brakes are operated by simultaneous application of manual and magnetic effort in a predetermined ratio, together with means to keep the ratio substantially uniform thruout the braking range.

An object of our invention is to combine an electro-magnetic means and a suitable controller therefor in a single device and to so locate the device in the chassis as to make little change in the conventional manually operable linkage.

Other objects will become apparent as the invention is described in detail and reference is made to the drawings wherein—

Fig. 1 is a perspective view of the brake operating hook-up of an automobile chassis combined with electro-magnetic means embodying our invention.

Fig. 2 is a longitudinal-vertical cross section thru the combined solenoid and controller.

Fig. 3 is a left hand end view of Fig. 2 with one of the contact pockets broken away.

Fig. 4 is a cross section taken at 4—4 of Fig. 2.

Fig. 5 is a schematic view of the contacts surrounding the controller cylinder laid out flat for clearness.

Fig. 6 shows the three different circuits made by the three controller positions thru the winding.

Similar numerals refer to similar parts thruout the several views.

In Fig. 1 the brake pedal 10, emergency lever 11, brake shafts 12, arms 13, equalizing link 14 and rods 15, 16, 17 and 18 compose a substantially standard hook-up where equalization between the front and rear brakes is desired.

In the ordinary manually operable braking system, pedal 10 is connected to link 14 by a rod similar to rod 18, but in the embodiment of our invention herein chosen for illustration this rod is replaced by specially constructed linkage comprising a rod 19 connecting to pedal 10, a rod 20 connecting to equalizing link 14, an electric current controlling member 21 carried by rod 22, and a solenoid core 23, all joined together to compose a tension member for operating link 14 by pedal 10, the solenoid body being supported in fixed relation to the chassis by bolts 24 extending thru frame cross member 25, (see also Fig. 3).

The device comprising a combined solenoid and an electric current controller therefor is shown to an enlarged scale in Figs. 2, 3 and 4, and consists of a series of four cylindrical coils 26, 27, 28 and 29 concentrically located with insulation 30 between, on tubular member 31.

A flange 32 integrally extending from tubular member 31 and another flange 33, of insulating material carrying a plurality of yielding coil contact members 34, hold the coils against endwise movement, and the bolts 24 which hold the device to cross member 25 also hold the flanges in place.

The coil contact members 34 (see Figs. 2 and 3) are T shaped pieces of conductive material extending thru slots into the inner opening of flange 33, and held pressed inwardly by springs 35, one only of which is shown in Fig. 3 where a portion of flange 33 is broken away. Screw caps 36 hold the springs in place and provide places for terminal screws 37 by means of which the coil leads are secured. The inner coil begins with lead 38 and ends with lead 39, the next coil begins with lead 40 and ends with 41 and so on, the two screws 37 not required for coil ends being used for line terminals 42 and 43.

The control member 21 is of cylindrical form and is composed principally of insulating material secured to rod 22 and has imbedded in its outer surface a plurality of contact blocks 44, 45, and 46 in three circular rows as shown, blocks of one row being connected to each other in different manner from blocks of another row.

For clearness the three cylindrical rows of contact blocks are laid out flat in Fig. 5 and the manner in which the blocks of a row are connected is diagrammatically shown. These connections are, in actual practice, imbedded and concealed in the mass 21 of insulating material. The cross section Fig. 4 shows how the row of blocks 45 are imbedded in the insulation, but does not show how the several blocks are connected one to another.

A battery 47 shown diagrammatically in Fig. 1 supplies the current to energize the solenoid coils, and a switch 48 on pedal 10 completes the circuit thru the coils when the pedal is depressed, the extent to which it is depressed determining the manner in which the coils are connected in the circiut, whether series, series parallel, or parallel.

In practice the operator depresses pedal 10 whereby he manually applies the brakes in the usual manner, but at the same time he depresses switch 48. Now, no current flows to the solenoid coils until the pedal is manually depressed sufficiently to permit the circular row of contact blocks 44 to engage contact members 34 whereupon current flows thru the coils 26, 27, 28 and 29 in series as at A, Fig. 6 and core 23 is drawn toward the interior of the winding. As the operator uses more manual effort to further depress the pedal he brings the row of contact blocks 45 into engagement with contact members 34 when, because of the manner in which contact blocks 45 are connected, (see Fig. 5) the coils are in series parallel as at B, Fig. 6, which increases the current and consequent magnetic strength, tending to draw core 23 into the winding. When the manual pressure is further increased, sufficiently to bring contact blocks 46 into communication with contact members 34, the coils will be all in parallel as at C, Fig. 6 and the tendency of core 23 to be drawn into the coils will be at its highest value.

From the foregoing description it will be apparent that the magnetic brake applying effort increases by steps as the manual effort is increased, and while for purposes of illustration we have shown a controller having but three steps from no magnetization to maximum magnetization, a greater number of smaller steps may be had by modifying the controller design. Many other modifications in structural detail and in the arrangement of the parts may be made within the scope of the invention, which is to be limited only by the following claims:—

1. A magnetic automotive brake comprising, brakes, brake operating linkage, a manual means to operate said linkage, an electro-magnet to operate said linkage having one element affixed to the chassis and the other element affixed to the linkage, a controller for said electro-magnet attached to said linkage, and a switch for said controller affixed to said manual means and simultaneously operable therewith.

2. A magnetic automotive brake comprising, brakes, brake operating linkage, a manual means to operate said linkage, a solenoid to operate said linkage having its coil affixed to the chassis and its core forming a part of said linkage, a controller for said solenoid attached to, and operable by the same said linkage, and a switch for said controller carried by said manual means and simultaneously operable therewith.

3. A magnetic automotive brake comprising, brakes, brake operating linkage, a manual means for operating said linkage, a solenoid for operating said linkage having a coil divided into a plurality of sections affixed to the chassis, a core for said solenoid attached to said linkage, a series-parallel controller for the several sections of said coil operable by said linkage, and a switch, adapted to make and break the circuit thru said controller, carried by said manual means and simultaneously operable therewith.

4. A magnetic automotive brake comprising, brakes, brake operating linkage, a manual means for operating said linkage, a solenoid for operating said linkage having its coil affixed to said chassis, said coil being divided into a plurality of sections and having contacts for each section supported on the coil, a core for said solenoid within said coil and forming a part of said linkage, a control member carried by said linkage having rows of contacts adapted successively to meet the contacts carried by the coil to connect them in series, series parallel or parallel, and a switch, adapted to make and break the circuit thru said controller, carried by said manual means and simultaneously operable therewith.

5. A magnetic automotive brake comprising, brakes, brake operating linkage, a manual means for operating said linkage, a solenoid for operating said linkage having its coil affixed to said chassis, said coil being divided into a plurality of sections each section terminating in contact members at the inner diameter of the coil, a cylindrical core of magnetic material for said solenoid, another cylindrical core of insulation carrying circular rows of contacts adapted successively to meet the coil contacts to connect the several coil sections in series, series parallel or parallel, and a switch, adapted to make and break the circuit thru said controller, carried by said manual means and simultaneously operable therewith.

6. In a solenoid for operating automotive brakes, a structure containing a winding divided into a plurality of sections and having a plurality of contact members for the terminals of the said sections extending thru the inner diameter of the said structure, a core for said solenoid slidable thru the said inner diameter, said core comprising a portion of magnetizable material and a portion of insulation, the insulation having imbedded therein circular rows of differently connected metal pads adapted to successively meet the said contact members to connect the coil section differently at different points in the travel of the said core.

7. In a solenoid for operating automotive brakes, a structure containing a winding divided into a plurality of sections and having a plurality of yielding contact members for the terminals of the said sections extending thru the inner diameter of the said structure, a core for said solenoid slidable thru the said inner diameter, said core comprising a cylindrical portion of magnetizable material axially adjacent a cylindrical portion of insulation the insulation having imbedded therein circular rows of differently connected metal pads adapted to successively meet the said contact members to connect the coil sections in series, in series-parallel, and in parallel as the core slides thru the coil structure.

8. A magnetic automotive brake comprising, in combination, brakes, brake operating linkage, a manual means to operate said linkage, an electro-magnet to operate said linkage having one element affixed to the chassis and the other element affixed to said linkage, a controller for said electro-magnet incorporated in said linkage and connected to said aforementioned other element, said controller being so constructed and arranged as to render active the electro-magnet upon movement thereof by said aforementioned manual means.

9. A magnetic automotive brake comprising brakes, brake operating linkage and manual means to operate said linkage, an electro-magnet to operate said linkage having its coil windings affixed to the chassis and its core affixed to the linkage, a controller for said electro-magnet incorporated within and forming a part of said linkage, said controller being so constructed and arranged as to render operative said electro-magnet upon lateral movement of said controller.

10. A magnetic automotive brake comprising brakes, brake operating linkage, a manual means to operate said linkage, an electro-magnet to operate said linkage having its coil windings affixed to the chassis frame and its core affixed to said linkage, a controller for said electro-magnet incorporated within said linkage so constructed and arranged as to progressively increase the effectiveness of said electro-magnet as the controller is moved laterally by said aforementioned manual means.

11. A vehicle brake mechanism comprising brakes, a manually operable brake operating member, means coupling said operating member with the brakes to apply them, and power means associated with the coupling means adapted to actuate the same, said power means being controlled by the position of the operating member and a separately manually operable control member carried thereby.

12. Vehicle brake mechanism including, in combination, brakes, a manually operable brake applying member, tension linkage coupling the brakes with the applying member, power means coupled with said linkage to actuate the same to apply the brakes, means carried by the tension linkage and associated with the power means for progressively increasing the power output on continued movement of the applying linkage, and means carried by the manually operable member for depowering said power means at any stage of manual application.

13. In combination with brakes and mechanical actuating linkage therefor including a manually operable member, power mechanism coupled with said linkage to actuate the same, and control means carried by said manually operable member operable independently of the movement thereof to impower or depower the power mechanism.

14. In combination with brakes and mechanical actuating linkage therefor including a manually operable member, power mechanism coupled with said linkage to actuate the same, means associated with said linkage in operative relation to the power mechanism for increasing the power output on brake actuating movement of the linkage, and control means carried by said manually operable member operable independently of the movement thereof to impower or depower the power mechanism.

In testimony whereof we hereunto set our hands.

VINCENT BENDIX.
VINCENT G. APPLE.